United States Patent [19]
Cairns

[11] 3,909,087
[45] Sept. 30, 1975

[54] COMPOSITE BEARINGS

[75] Inventor: James W. Cairns, Cherry Hill, N.J.

[73] Assignee: Garlock Inc., Palmyra, N.Y.

[22] Filed: Nov. 29, 1974

[21] Appl. No.: 528,203

Related U.S. Application Data

[63] Continuation of Ser. No. 324,548, Jan. 17, 1973, abandoned.

[52] U.S. Cl. .............................. 308/238; 308/240
[51] Int. Cl.² ........................................ F16C 27/00
[58] Field of Search . 308/240, 238, DIG. 7, DIG. 8; 252/12

[56] References Cited
UNITED STATES PATENTS

| | | | |
|---|---|---|---|
| 2,851,316 | 9/1958 | Thomson | 308/240 |
| 3,210,137 | 10/1965 | Williams | 308/240 |
| 3,313,579 | 4/1967 | Seidenfeld | 308/240 |
| 3,582,166 | 6/1971 | Reising | 308/238 |
| 3,746,415 | 7/1973 | Thomson | 308/240 |

*Primary Examiner*—M. Henson Wood, Jr.
*Assistant Examiner*—Gene A. Church
*Attorney, Agent, or Firm*—Schovee & Boston

[57] ABSTRACT

A high load carrying composite bearing having a pair of substantially coextensive members disposed in bonded relationship relative to one another and comprising a high strength resilient bearing surface layer forming one of said members, with said surface layer characterized by a thickness of below 0.060 inch and consisting essentially of at least one unfilled, solid-lubricant-free material selected from the class consisting of polyarylene sulfides, epoxy resins, aromatic polyamide resins, polyester resins, phenoxy resins, polyimide resins, polyamide-imide resins, polypropylene resins and polysulfone resins. The bearing surface layer component of the bearing element has one face thereof bonded to and supported by a rigid substrate which forms the other of the substantially coextensive members forming the bearing.

The invention provides a bearing element which, with conventional lubrication, has bearing properties which are better than those of known bearing elements requiring lubrication, and which is far superior to self-lubricating materials.

27 Claims, 5 Drawing Figures

COMPOSITE BEARINGS

This is a continuation of application Ser. No. 324,548 filed Jan. 17, 1973 now abandoned.

BACKGROUND OF THE INVENTION

1. Field of the Invention

This invention relates to plain bearings, and more particularly is concerned with a composite bearing element including a rigid non-porous backing member to which there is secured a thin bearing surface layer formed of an unfilled, solid-lubricant-free synthetic polymer or mixture of synthetic polymers, which, with conventional lubricant oil or grease provides an outstanding combination of high load carrying capacity as well as structural and thermal stability during use.

2. Description of the Prior Art

Metallic bearings, although lubricated, often perform poorly in less than ideal conditions, particularly with sparse lubrication in high load, low speed applications where the value ZN/P is less than 50, where Z is the lubricant absolute viscosity in centipoises, N is the rotational speed of the journal in revolutions per minute, and P is the projected area unit load in pounds per square inch.

Molded bearings made from acetal and nylon materials have been widely used in numerous configurations, and it is known that these materials provide excellent performance with sparse lubrication. Their area of application is, however, limited by virtue of their load carrying capacity and structural and thermal stability. Serious loading problems are encountered due to the cold-flow characteristics of such plastic materials and loss in housing retention which is attributed to the thermal instability of such plastics, particularly when the bearing is in bushing form.

A well known, commercially available material sold under the designation "DX" by Garlock, Inc., and described in Garlock Bulletin No. 662, entitled "DX Prelubricated Bearings", affords a decided improvement over the prior art bearing structures. The composite bearing material of which the DX bearings are formed comprises a steel backing layer to which there is attached a sintered layer of powdered metal which is used for the mechanical attachment of an acetal copolymer bearing surface fo the order of 0.010 inch thick to the steel substrate. A comparison of the performance of various bearing materials is set forth in Tables I and II below.

TABLE I

| Material | Maximum PV Attained (PST-FPM) | Hours at Maximum PV For Seizure |
| --- | --- | --- |
| 80/10/10 Lead Bronze | 200,000 | 7 |
| 74/22/4 Lead Bronze | 300,000 | 0.5 |
| 80/1/10 Lead Bronze (Indented & Graphited) | 400,000 | 1 |
| 8% Graphite in Tin Bronze | 300,000 | 3 |
| Oil Impregnated Porous Bronze | 300,000 | 1 |
| DX Bearings | 500,000 | 336* |

Bushings were run for 24 hours at each increment of 100,000 PV until seizure occurred on a specimen ⅝" bore × ¾" long.
The load was increased from 400 PSI to 2,000 PSI, or until seizure was obtained at a shaft speed of 1500 RPM with oil lubrication.
*Test stopped - .001" wear

TABLE II

| Material | Life Hours |
| --- | --- |
| 74/22/4 Lead Bronze | 552 |
| Oil Impregnated Porous Bronze | 506 |
| DX Acetal Copolymer Attached to Steel Via a Powdered Metal Sintered Layer | |
| Plain Bore | 1,500 |
| Indented Bore | 4,500 |

The foregoing tests were conducted at 20,000 PV (150 PSI, 133 FPM) on a specimen ⅝" bore × ¾" long.

As can be seen from Tables I and II above, improved performance can be attained by utilizing bearings including acetal copolymer bearing surfaces attached to steel via a powdered metal sintered layer. However, such bearings have limitations in that the need for a powdered metal inner layer, which is required as a result of the inherently poor adhesive properties of the acetal surface, has severely restricted the load carrying capacity of the composite structure. Furthermore, the acetal bearing surface layer is degraded in an acidic environment which often may be generated in the recirculating lubricant systems with which the bearing may be used. The cold flow of the composite bearing including the acetal bearing surface also becomes a problem at elevated temperatures which are often realized in applications where synthetic lubricants are used.

U.S. Pat. No. 3,305,325 — LeBrasse et al. describes an effort to apply nylon and a lubricant filler to a rigid backing via a sintered porous layer. The bearings there described by the patentees are intended for use under moderate loads and moderate temperatures in a substantially dry or non-lubricated condition. Again, this method of utilizing a sintered porous layer as a means of attaching the plastic bearing surface layer to the supporting substrate presents the same problem as was encountered with DX type bearings described above, and has proven to be both expensive and difficult to accomplish, particularly with filled polymer materials.

U.S. Pat. No. 3,629,103 — Korshak et al. describes a plastic antifriction material containing a polyimide resin, powdered solid lubricants as fillers, and a polyarylate or aromatic polyamide. The latter materials are said to exert a stabilizing effect on the coefficient of friction over a wide range of temperatures. The solid lubricant filled bearing material is specifically intended for use under dry friction conditions.

U.S. Pat. No. 3,647,500 — Mizuno describes an oil-free slider bearing comprising a metal surface substrate and a porous bearing resin layer formed of polycarbonate, polysulfone or polyphenylene oxide resin. The bearing resin layer is directly sintered onto the metal surface and the pores thereof additionally include a mineral wax impregnant. Again, the patent represents an approach which contemplates modified composites to achieve self-lubricating properties.

The production of generally tubular bearing elements including an inner liner formed of interlaced strands of yarn bonded to a rigid concentric backing for the liner are described in U.S. Pat. No. 3,792,375. The fabric liner forming the bearing structure may comprise a plurality of polyfluorocarbon filaments intertwined with filaments of a bondable fibrous material such as cotton, rayon, polyester or any of the various nylons. The backing for the liner described by the patentees comprises a cured hardenable resin having embedded therein a plurality ot interlacingly wound, resin-bondable reinforcing fiber layers at least some of which are helically wound. Such bearing elements are also described in Belgian patent 760,308.

As will be appreciated by those skilled in the art, prior art efforts have contemplated solid lubricant filled or modified polymers to provide self-lubricating properties. Self-lubricated bearings of the type described in the aforesaid patents are nevertheless characterized by a finite life due to the progressive wear of the bearing surface, which life is often further limited by unacceptable clearance created by such wear phenomena.

SUMMARY OF THE INVENTION

The present invention contemplates a composite bearing element which, by direct application of a thin film bearing surface layer to a rigid backing, provides a bearing surface with a high load carrying capacity and resilience over a wide range of temperatures at which conventional lubricants are normally employed.

Unexpectedly, it has been discovered that improved bearing properties can be achieved by using certain specific types of unfilled polymers in combination with conventional lubricating oils or greases, providing that the bearing surface is in the form of a relatively thin surface layer which serves to restrict cold flow of the material, provide increased load carrying capacity, and afford maximum heat transfer during use. Composite bearings produced in accordance with the invention will, in combination with conventional oil or grease lubricants, be characterized by bearing lives far exceeding those of known self-lubricating materials.

It is therefore a primary object of the invention to provide a high load application composite bearing having a pair of substantially coextensive members disposed in bonded relationship relative to one another, the bearing comprising a high tensile strength, resilient bearing surface layer forming one of said members, said surface layer being characterized by a thickness of less than 0.060 inch and consisting essentially of at least one unfilled, solid-lubricant-free material selected from the class consisting of polyarylene sulfide resins, epoxy resins, aromatic polyamide resins, polyester resins, polyimide resins, polyamide-imide resins, polypropylene resins and polysulfone resins. The bearing surface layer of the composite bearing element of the invention has one of its faces bonded to and supported by a rigid substrate which forms the other of the two substantially coextensive members which are disposed in bonded relationship relative to one another. According to a preferred form of the invention, the composite bearing element further includes means, including the surface of said layer, for retaining lubricant grease or oil, and directing such lubricant toward the loaded zone of the bearing surface when the bearing element is in use.

The surface layer of the composite bearing of the invention, by virtue of thinness and adherence to the rigid backing member, is structurally and thermally stable when supporting high loads over a wide range of temperatures. With sparse lubrication it provides bearing performance superior to that of metallic bearings without the wear rates associated with self-lubricating materials such as filled nylon, acetal, PTFE, and other plastic materials described in the prior art. In addition, the use of one or more of the above described unfilled polymers simplifies manufacturing processes and thereby reduces bearing production costs. The bearings of the invention are not expected to have self-lubricating properties and have been herein specifically designated as "unfilled, solid-lubricant-free" in the sense that the designated material of which the bearing surface layer is formed does not include any solid lubricant filler such, for example, as fibrous or particulate polytetrafluoroethylene, graphite, molybdenum disulfide or other solid lubricant material of the type well known in the art.

The polypropylene resins useful in the practice of the invention are well known, commercially available thermoplastic polymers. In general, the stereo regular or isostatic polypropolyene polymers are employed.

The polyarylene sulfide polymers useful in the practice of the invention are those formed by the reaction of at least one polyhalo-substituted monocyclic aromatic compound with an arylene metal sulfide. Such polymers are well known in the art, and they are disclosed in U.S. Pat. No. 3,354,149 — Edmonds et al., U.S. Pat. No. 3,285,850 — Graham, U.S. Pat. No. 3,592,783 — Edmonds. In general, the preferred polyaryl sulfide is polyphenylene sulfide, which is crystalline aromatic polymer having a symmetrical, rigid backbone chain consisting of para-substituted benzene rings and sulfur atoms, and characterized by the recurring structural unit

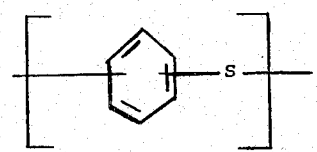

Good adhesion of polyphenylene sulfide to steel substrates may be attained by a combination of degreasing followed by treatment at 700°F. in air. Other techniques of applying polyphenylene sulfide coatings to metallic substrates are described by Hill and Workman in their article "Polyphenylene Sulfide" appearing in 1970–1971 issue of *Modern Plastics Encyclopedia*, pp. 208, 213.

The epoxy resins useful in the practice of the invention are also well known commercially available materials and generally comprise the reaction products of an epihalohydrin, such as epichlorohydrin and a phenol having at least two phenolic hydroxy groups, such as bis-4(hydroxyphenyl)-2,2 propane(bisphenol-A). Examples of such resins are given in U.S. Pat. No. 2,324,483 and 2,444,333 to Castan, British patents 518,017 and 579,698, and U.S. Pat. Nos. 2,494,295 and 2,511,913 to Greenlee and U.S. Pat. No. 2,500,600 to Bradley. In addition, phenolnovolac epoxy resins, ortho-cresol modified epoxy resins and epoxy resins produced from cycloaliphatic polyols may be employed.

A particularly preferred aromatic polyamide is poly(-m-phenylene-isophthalamide) produced and marketed by the Du Pont Company under the trade designation "Nomex" and characterized by a breaking strength at 482°F. equivalent to 60% of that at room temperature. Other suitable polyamides useful in the practice of this invention as well as methods for their preparation are described in "New Linear Polymers" by Lee, Stoffey and Neville, McGraw Hill Book Company, 1967, whose disclosure by reference is hereby incorporated as part of the disclosure of this invention.

The polyesters useful in the practice of the invention include the high temperature aromatic polyesters such, for example, as sold commercially by the Carborundum Company under the trade designation "Ekonol," whose structure is characterized by a repeating chain of p-oxybenzoyl units. In addition, thermoplastic polyesters such, for example, as sold commercially under the trade designation "Celanex" by Celenese Plastics, "Tenite" by Eastman Chemical, and "Valox" by General Electric may be employed.

The phenoxy resins useful in the practice of the invention are well known materials that are generally prepared by reacting a dihydric phenol with an epihalohydrin, such as epichlorohydrin, in the presence of a caustic. Generally speaking, a dihydric phenol such a bisphenol A is reacted with epichlorohydrin in a 1 to 1 mole ratio in the presence of a dehydrohalogenating agent, such as sodium hydroxide. If desired, a mixture of two or more dihydric phenols may be employed. Examples of phenoxy resins which may be used in the invention are those sold by the Union Carbide Plastics Company under the trade designations "PRDA–8100", "PRDA–8060" and "PRDA–8160". Other suitable phenoxy resins useful in the practice of the invention as well as methods for their preparation are described in the Lee, Stoffey and Neville text "New Linear Polymers" referred to above.

The aromatic polyimides useful to provide the bearings of the invention include the aromatic polyimides made by reacting a dianhydride such, for example, as pyromellitic dianhydride with an aromatic diamine such, for example as a meta- or para-phenylenediamine. A specific example of a polyimide which may be used is a high molecular weight polymer product of the reaction of 4,4′diaminodiphenyl methane with pyromellitic dianhydride. Further examples of typical diamines and dianhydrides useful in the production of polyimides such as may be used in the practice of the invention are disclosed in the Lee, Stoffey, and Neville text "New Linear Polymers" referred to above.

The aromatic polyamide-imides useful in the practice of the invention include the condensation products of an aliphatic or aromatic diamine with a tri- or tetra-carboxylic aromatic or aliphatic acid. Suitable polyamide-imides can be prepared from methylene dianiline and trimellitic anhydride, and from N,N′ bis(3-aminophenyl)isophthalamide and pyromellitic dianhydride. A specific polyamide-imide which may be used is sold commercially by Amoco Chemicals Corp. under the trade designation "Torolon". Other suitable polyamides-imides resins useful in the practice of the invention are described in the Lee, Stoffey and Neville text referred to above and Volume 49, *Modern Plastics Encyclopedis* No. 10A, October 1972, pp. 120, 155.

The aromatic polysulfones useful in the practice of the invention include the linear, high molecular weight polyaryl sulfones such, for example, as may be produced by reacting the disodium salt of an aromatic dithiol with a dihalodiphenyl sulfone. Specific examples of starting materials and methods used in preparing aromatic polysulfones are described in the aforesaid text "New Linear Polymers." A preferred polysulfone useful in the practice of the invention is obtained by reacting the disodium salt of bisphenol-A with p,p′-dichlorodiphenyl sulfone in dimethylsulfoxide and chlorobenzene. An example of a suitable polysulfone material useful in the practice of the invention is the polysulfone sold commercially by the 3M Company under the trade designation "Astrel" 360 Plastic.

DESCRIPTION OF THE DRAWING AND PREFERRED EMBODIMENTS

For further objects and advantages of the invention, and for a more detailed discussion of the preferred embodiments thereof, reference is to be had to the following description taken in conjunction with the accompanying drawing in which.

Figure 1:
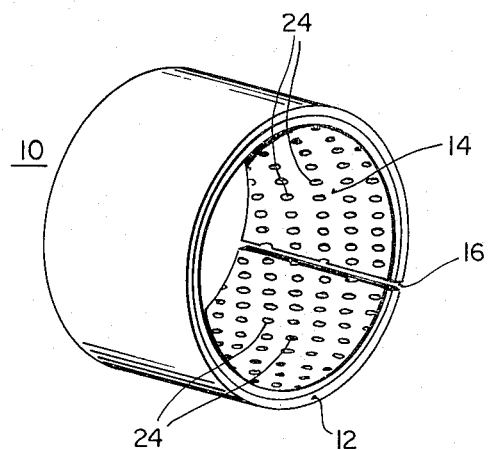
FIG. 1 is an isometric view of a sleeve bearing element according to one form of the invention.

Referring now to FIG. 1, a high load application composite bearing element in the form of a sleeve bearing 10 is provided in accordance with the invention having a pair of substantially coextensive, generally cylindrical members 12, 14 substantially concentrically disposed in bonded relationship one to other. The bearing element 10 is also provided with a slit 16 to permit manufacture by knuckling a strip of the bearing composite. The inner member 14 comprises a high strength, resilient bearing surface layer in the form of a film or fibers characterized by a thickness of less than 0.060 inch, and preferably ranging from about 0.005 inch to about 0.030 inch. The surface layer 14 is formed of at least one of the plastic materials mentioned above. As shown in FIG. 1, layer 14 has its convex face bonded to and supported by a rigid, non-porous substrate 12 which forms the other member of the bearing element 10. The backing member 12 may be formed of a metal such as, for example, iron, steel, copper, aluminum, brass, bronze, nickel or titanium. Other suitable backing members, including glass fiber filament windings, will readily occur to those skilled in the art.

Figure 2:
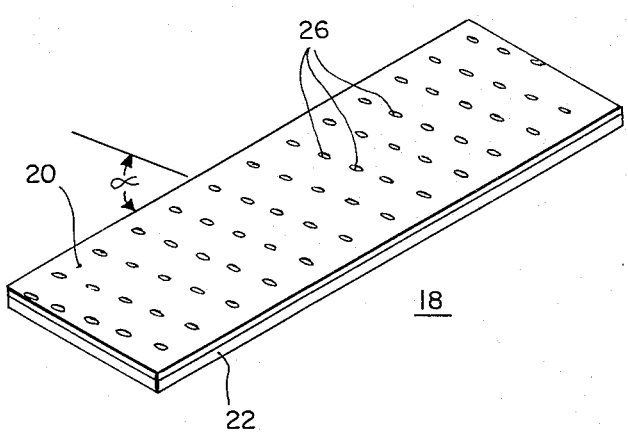
FIG. 2 is an isometric view of a high load application composite bearing element forming another embodiment of the invention.

As shown in FIG. 2 a high load application composite bearing element 18 is shown in the form of flat stock and including a pair of substantially coextensive members 20, 22 disposed in bonded relationship one to the other. The bearing surface layer 20 is formed of a film or fibers of one of the aforesaid plastic materials and is characterized by a thickness of less than 0.060 inch. The inner face of the layer 20 is bonded to and supported by the rigid non-porous substrate 22 which forms the other of the two bearing members which, in combination, form the bearing element of the invention. The rigid non-porous substrate 22 is formed of any suitable materials such as mentioned above.

Metal backings of the type used in the embodiments illustrated in FIGS. 1 and 2 lend themselves to platen press manufacture of the composite bearing elements of the invention. In addition, the metal backings 12, 22 are useful in the production of coils of the composite bearing element of which the bearings of the invention may be economically produced. Preferably, the backing or supporting members 12, 22 to which the plastic bearing surface layers 14, 20 respectively are bonded have a thickness of 0.125 inch or less.

In general, the adhesion or bonding of the bearing surface layer (14 in FIG. 1 and 20 in FIG. 2) to the rigid, ductile backing member (12 in FIG. 1 and 22 in FIG. 2) may be achieved by any of the well known bonding techniques known to those skilled in the art. Good adhesion of the various plastic materials referred to above to metal backing surfaces may be achieved by a simple degreasing treatment followed by a heat treatment. Preferably, the metallic substrate can be roughened to assure the production of a high strength bond with the bearing surface layer which is to be bonded thereto. Any method of roughening the surface can be employed, i.e. mechanical (as by sandblasting or surface scratching) or chemical (as by etching with acid or base). Suitable methods for roughening the surface of the backing layer or substrate will readily occur to those skilled in the art. It will be appreciated that where a roughening step to prepare the substrate surface has been employed a subsequent cleaning of the surface may be necessary to remove any particulate material generated during the roughening operation.

The bonding of the thin bearing surface layers 14, 20 to the rigid backing members 12, 22 respectively, can also be accomplished with the aid of any suitable adhesive which will not unduly decompose at temperatures at which the bearing surfaces 14, 20 are to be used, and which have a capacity to assure a good, high strength bond between the backing member and the particular plastic bearing surface layer which is employed. In general, any of the epoxy, modified epoxy, polyimide, phenolic, polysulfone, or polyester adhesives may be advantageously used. Examples of suitable adhesives include "Epoxylite 5403" and "Epoxylite 6203" sold by Epoxylite Corporation; "Leal C" sold by the Leal Company "ERL 256" and "Polysulfone P-1700" sold by Union Carbide. Other suitable adhesives include phenolic cements such as "Armstrong N-101" sold by Armstrong Cork Company and "Resinox EXEL 533" and "Resinox EXEL 530" sold by Monsanto. Polyimide cement such a "Metalbond 840+ sold by Whitaker Corporation may also be used.

In the embodiments shown in FIGS. 1 and 2, each of which illustrates a composite bearing element particularly suitable for high load, low speed applications the performance of the bearings is further improved by the introduction of a pattern of surface indentations or grooves (24 in FIG. 1, 26 in FIG. 2) on the bearing surface layer (14, 20 respectively) in a manner such as to permit lubricant oil or grease applied to the surface layer to be directed toward the loaded zone of the layer surface under given conditions of relative motion. As shown in both FIGS. 1 and 2, a preferred indent pattern would be staggered to assure that the total surface area of the loaded zone is supplied with lubricant during use. In this connection, the indent pattern may be such that the indents are alligned diagonally across the bearing layer, i.e. are aligned in rows which are at some angle between 0° and 90° relative to one edge of the bearing layer or to the direction of motion between the gearing layer and its mating surface during use. Thus, referring to FIG. 2, the pattern of indents 26 in the surface of bearing element 20 is shown to be disposed at an angle $\alpha$ which is approximately 45° with respect to the edge 26 of the bearing element 18. Other geometric patterns of surface indentations or grooves which will assure the desired supply of lubricant to the loaded zone of the bearing during use will readily occur to those skilled in the art.

While the volume of the indentations (24 in FIG. 1, 26 in FIG. 2), or lubricant reservoirs, in the bearing surface layer may vary to some degree, it has been found that particularly advantageous results may be obtained where the total volume of indents or lubricant reservoirs represents from about 30% to about 40% of the total volume of the bearing surface layer. The surface indents may be of any geometric shape, i.e. cylindrical or conical, or may be in the form of a prism. The desired indent pattern 26 may be applied by passing the bearing element 18 between the heated rolls of a rolling mill having protrusions in the form of pins or prisms representing the desired indent patterns.

Figure 3:
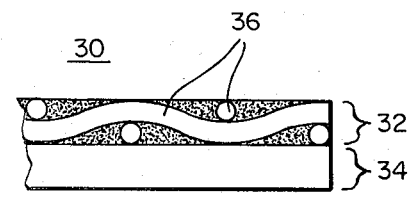
FIG. 3 is a vertical section from a portion of a high load application composite bearing element forming still another embodiment of the invention.

FIG. 3 illustrates the further embodiment of the invention wherein the composite bearing element 30 has a pair of substantially coextensive members 32, 34 disposed in bonded relationship one to the other. Layer 32 is comprised of high strength resilient fibers of one or more of the aforementioned polymers bonded to the backing, using one of the previously mentioned adhesives. The layer 32 is characterized by a thickness of less than 0.060 inch, and is bonded to a suitable nonporous substrate 34 which forms the other of the bearing members forming the composite bearing element of the invention.

Figure 4:
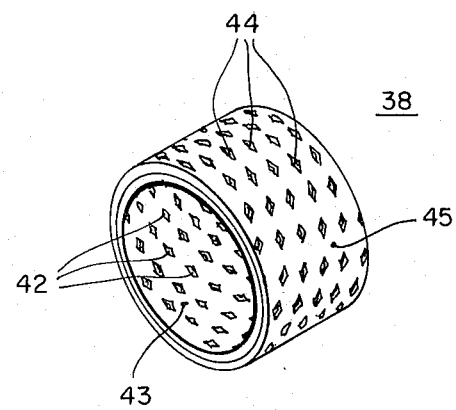
FIG. 4 is an isometric view of a bearing liner useful in the production of a composite bearing element in accordance with the invention.

FIG. 4 illustrates a high load carrying composite bearing element 38 of generally cylindrical configuration having the desired pattern of lubricant oil or grease reservoirs in the form of holes or apertures 42, 44 produced through the total thickness of the bearing composite. With a single initial lubrication this configuration provides maximum lubricant volume and, therefore, maximum service life. Alternatively, the construction shown provides an excellent method for allowing ingress of lubricant from an external source, such, for example, as an absorbent wick. As shown in FIG. 4, the composite bearing of the invention includes an inner bearing surface layer 43 bonded to an outer rigid backing layer 45 in substantially concentrically disposed relationship. The bearing surface layer 43 and the reinforcing backing layer 45 include a plurality of holes or apertures 42, 44, and are arranged such that each aperture of one of the layers is in substantial registry with a corresponding aperture of one of the other of said layers to permit lubricant oil or grease to be supplied through the apertures of the entire composite assembly and to the bearing surface when the bearing is in actual use.

The bearing surface layer 43 (which forms the inner or concave surface of the bearing 38) is, in accordance with the invention, characterized by a thickness below 0.060 inch. and preferably ranges from 0.005 to 0.030 inch, to resist cold flow during bearing operation, and consists essentially of filaments or fibers of at least one unfilled, solid-lubricant-free material selected from the above-described class of polymeric resin materials. The rigid backing layer 45 of the composite assembly 38 comprises the convex outer surface of the assembly and is formed of a structural resin having embedded therein a plurality of structural resin bondable reinforcing filaments or fibers. The filaments or fibers of the unfilled solid-lubricant-free material forming the bearing surface layer 43 as well as the structural resin bondable reinforcing filaments or fibers in the reinforcing backing layer 45 are so constructed and arranged relative to one another in a winding pattern to provide the plurality of apertures 42, 44 through which lubricant oil or grease may be supplied to the bearing surface when the bearing is in use.

To produce a sleeve bearing of the type illustrated in FIG. 4, the yarns or threads of the selected unfilled, solid-lubricant-free material may be wound or braided over a mandrel under tension in a pair of crossed helically wound layers of opposite pitch to form a compact inner bearing surface composed entirely of the yarns or threads employed. The yarn braiding or winding is performed in a manner such as to provide the desired apertures in the bearing surface layer. For example, the mandrel may include protruding lugs or pins spaced apart in the desired configuration and of a shape corresponding to the desired shape of the apertures which are to be provided in the composite bearing. The yarn used can be formed of monofilament thread or of a twisted thread made of smaller component fibers of the specific material selected. If desired, the yarns or threads can be pre-impregnated with a suitable resin impregnant adhesive of the type described above to facilitate bonding with the backing member 45.

After the desired thickness of fibers or yarns of the unfilled, solid-lubricant-free material has been wound or braided about the mandrel in the desired fashion, the assembly can be over-wound with a wrapping of structural resin pre-impregnated reinforcing filaments or fibers to provide the backing member of the composite bearing assembly. Examples of suitable materials for use in this connection are glass/epoxy, glass/polyester, glass/phenolic, linen/phenolic and cotton/phenolic. Other filaments, fibers and suitable resin impregnants for providing the rigid backing layer will readily occur to those skilled in the art. As in the case of the fibers forming the inner bearing surface layer 43, the over-wrapping of the structural resin pre-impregnated fibers or yarns, as of glass for example, is conducted in a manner so as to produce the desired apertures 44 in the backing layer 45 in substantial registry with the apertures 42 in the inner bearing surface layer.

Upon completion of the application of the filament or yarn winding to form the rigid backing layer 45 of the bearing assembly, the resin impregnant is cured by conventional techinques and the assembly cooled and subsequently removed from the mandrel. The amount of finish machining, if any, will depend upon the tolerances required in a specific bearing application. Shaft bushings with the bearing surface layer on the outside can be produced by reversing the foregoing procedure.

Figure 5:
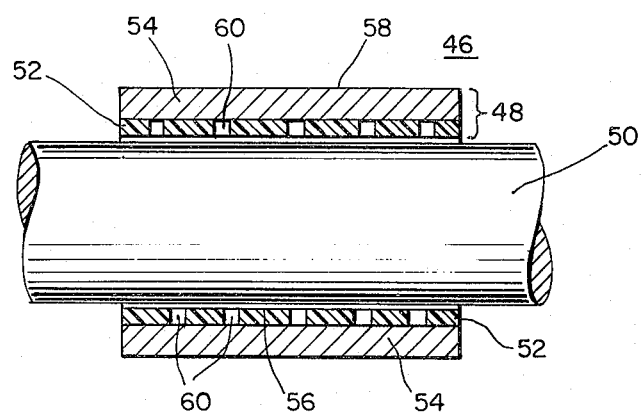
FIG. 5 is a sectional view of a bearing assembly forming yet another embodiment of the invention.

FIG. 5 illustrates a high load carrying lubricated bearing assembly 46 including outer 48 and inner 50 bearing members having mating bearing surfaces. As shown in FIG. 5 the outer bearing member is in the form of a bushing including a layer 52 which has a thickness of less than 0.060 inch, and whose outer face is bonded to the rigid backing 54. The outer bearing element 48 is therefore of generally cylindrical configuration having a concave inner surface 56 and a convex outer surface 58 which are substantially concentrically disposed. The bearing surface layer 52 forms the concentrically disposed inner bearing surface 56 and is in the form of film of one of the plastic materials referred to above.

The bearing assembly of FIG. 5 further includes a thin film of lubricant oil or grease disposed between the bearing layer surface 56 and the mating surface of the other bearing member 50 forming the bearing assembly 46. The surface of the bearing layer 52 includes indents 60 for retaining the aforesaid lubricant grease or oil and directing such lubricant toward the loaded zone of the bearing surface when the bearing assembly is in use. As noted above, the pattern of indents 60 in the surface layer 52 is staggered to assure that the total surface area of the loaded zone is supplied with lubricant during bearing operation.

The preferred lubricants used to provide superior performance of the high load application lubricated bearings of the invention are the premium grade lubricants well known to those skilled in the art. Included among the lubricants which may be used are the well known lubricant greases and oils such, for example, as silicone oils and greases, lithium based greases with or without additives, and oils which have the high temperature capabilities for use in temperatures above 150°F. Such lubricants are commercially available and are well known to those skilled in the art.

The preferred form of the composite high load carrying bearing element of the invention as illustrated in FIGS. 1 and 5 is characterized by good resilience, structural and thermal stability, and is especially adapted to support high loads. As noted above, the bearing surface layer formed of the unfilled, solid-lubricant-free material must be below 0.060 inch to assure resistance to cold flow during bearing operation. Preferably, the thickness of the bearing layers will lie within the range of 0.005 to 0.030 inch. With sparse lubrication, the bearing is especially suitable for high load, low speed application. The performance of the bearing is further improved by the introduction of a pattern of surface indentations or grooves as discussed above, in a manner such that the lubricant used is directed toward the loaded zone of the bearing surface when the bearing is in use.

It should be understood that while the present invention has been described in considerable detail with respect to certain specific embodiments thereof, it is not to be considered limited to those embodiments, but may be used in other ways without departure from the spirit of the invention or the scope of the appended claims.

What is claimed is:

1. A high load carrying composite bearing element having a pair of substantially coextensive members disposed in bonded relationship one to another, said bearing element comprising a high strength, resilient bearing surface layer forming one of said members, said surface layer being characterized by a thickness of less than 0.060 inch and consisting essentially of at least one unfilled, solid-lubricant-free material selected from the class consisting of polyarylene sulfides, epoxy resins, aromatic polyamide resins, polyester resins, polyimide resins, polyamide-imide resins, polypropylene resins and polysulfone resins, said layer having one face bonded to and supported by a rigid, non-porous substrate forming the other of said members.

2. The bearing element of claim 1 in which said element is of generally tubular configuration having concave inner and convex outer surfaces substantially concentrically disposed, said bearing surface layer forming one of said concentrically disposed inner and outer surfaces.

3. The bearing element of claim 1 in which said bearing layer includes means including the surface of said layer adapted to retain lubricant grease or oil and direct said lubricant toward the loaded zone of said bearing surface when said bearing element is in use.

4. The bearing element of claim 1 in which the thickness of said bearing layer ranges from 0.005 to about 0.030 inch.

5. The bearing element of claim 1 in which said bearing layer is formed of polyarylene sulfide resin.

6. The bearing element of claim 1 in which the bearing layer is formed of an epoxy resin.

7. The bearing element of claim 1 in which the bearing layer is formed of an aromatic polyamide resin.

8. The bearing element of claim 1 in which the bearing layer is formed of a polyester resin.

9. The bearing element of claim 1 in which the bearing layer is formed of a polyimide resin.

10. The bearing element of claim 1 in which the bearing layer is formed of a polyamide-imide resin.

11. The bearing element of claim 1 in which the bearing layer is formed of a polypropylene resin.

12. The bearing element of claim 1 in which the bearing layer is formed of a polysulfone resin.

13. The bearing element of claim 5 wherein said polyarylene sulfide resin is polyphenylene sulfide resin.

14. In a high load carrying lubricated bearing assembly including inner and outer bearing members having mating bearing surfaces,
   a bearing layer disposed between said surfaces, with said layer having one face thereof bonded to a nonporous surface of one of said bearing members and its other face forming a bearing surface mating with the other of said members.
   the improvement in which the bearing layer is characterized by a thickness below 0.060 inch to resist cold flow during bearing operation and consists essentially of at least one unfilled, solid-lubricant-free material selected from the class consisting of polyarylene sulfides, epoxy resins, aromatic polyamide resins, polyester resins, polyimide resins, polyamide-imide resins, polypropylene resins, and polysulfone resins and
   a thin film of lubricant oil or grease disposed between said layer surface and the mating surface of the other of said bearing members.

15. The high load carrying lubricated bearing of claim 14 having means, including the surface of said layer, for retaining said lubricant and directing said lubricant toward the loaded zone of said bearing surfaces when said bearing is in use.

16. The high load carrying lubricated bearing of claim 14 in which said inner and outer bearing members are generally tubular and are disposed in substantially concentric relationship relative to one another.

17. The high load carrying lubricated bearing of claim 14 in which the thickness of said layer is from about 0.005 to about 0.030 inch.

18. The high load carrying lubricated bearing of claim 14 in which said layer is formed of a polyarylene sulfide resin.

19. The high load carrying lubricated bearing of claim 14 in which said layer is formed of an epoxy resin.

20. The high load carrying lubricated bearing of claim 14 in which said layer is formed of an aromatic polyamide resin.

21. The high load carrying lubricated bearing of claim 14 in which said layer is formed of a polyester resin.

22. The high load carrying lubricated bearing of claim 14 in which said layer is formed of a polyimide resin.

23. The high load carrying lubricated bearing of claim 14 in which said layer is formed of a polyamide-imide resin.

24. The high load carrying lubricated bearing of claim 14 in which said layer is formed of a polypropylene resin.

25. The high load carrying lubricated bearing of claim 14 in which said layer is formed of a polysulfone resin.

26. The high load carrying lubricated bearing of claim 18 wherein said polyarylene sulfide resin is polyphenylene sulfide resin.

27. A high load carrying composite bearing of generally cylindrical configuration including a bearing surface layer bonded to a rigid backing layer in substantially concentrically disposed relationship,
   said bearing surface layer and said reinforcing backing layer including a plurality of apertures arranged such that each aperture in one of said layers is in substantial registry with an aperture in other of said layers to permit lubricant oil or grease to be supplied through said apertures in said layers and to the bearing surface when said bearing is in use.
   said bearing surface layer characterized by a thickness of below 0.060 inch to resist cold flow during bearing operation and consisting essentially of filaments or fibers of at least one unfilled, solid-lubricant-free material selected from the group consisting of polyarylene sulfides, epoxy resins, aromatic polyamide resins, polyester resins, polyimide resins, polyamide-imide resins, polypropylene and polysulfone resins,
   said rigid backing to which said bearing surface layer is bonded comprising a structural resin having embedded therein a plurality of structural resin bondable reinforcing filaments or fibers,
   said filaments or fibers of said unfilled solid-lubricant-free material forming said bearing surface layer and said structural resin bondable reinforcing filaments or fibers in said backing layer being helically wound and so constructed and arranged relative to one another in a winding pattern to provide said plurality of apertures.

* * * * *